UNITED STATES PATENT OFFICE.

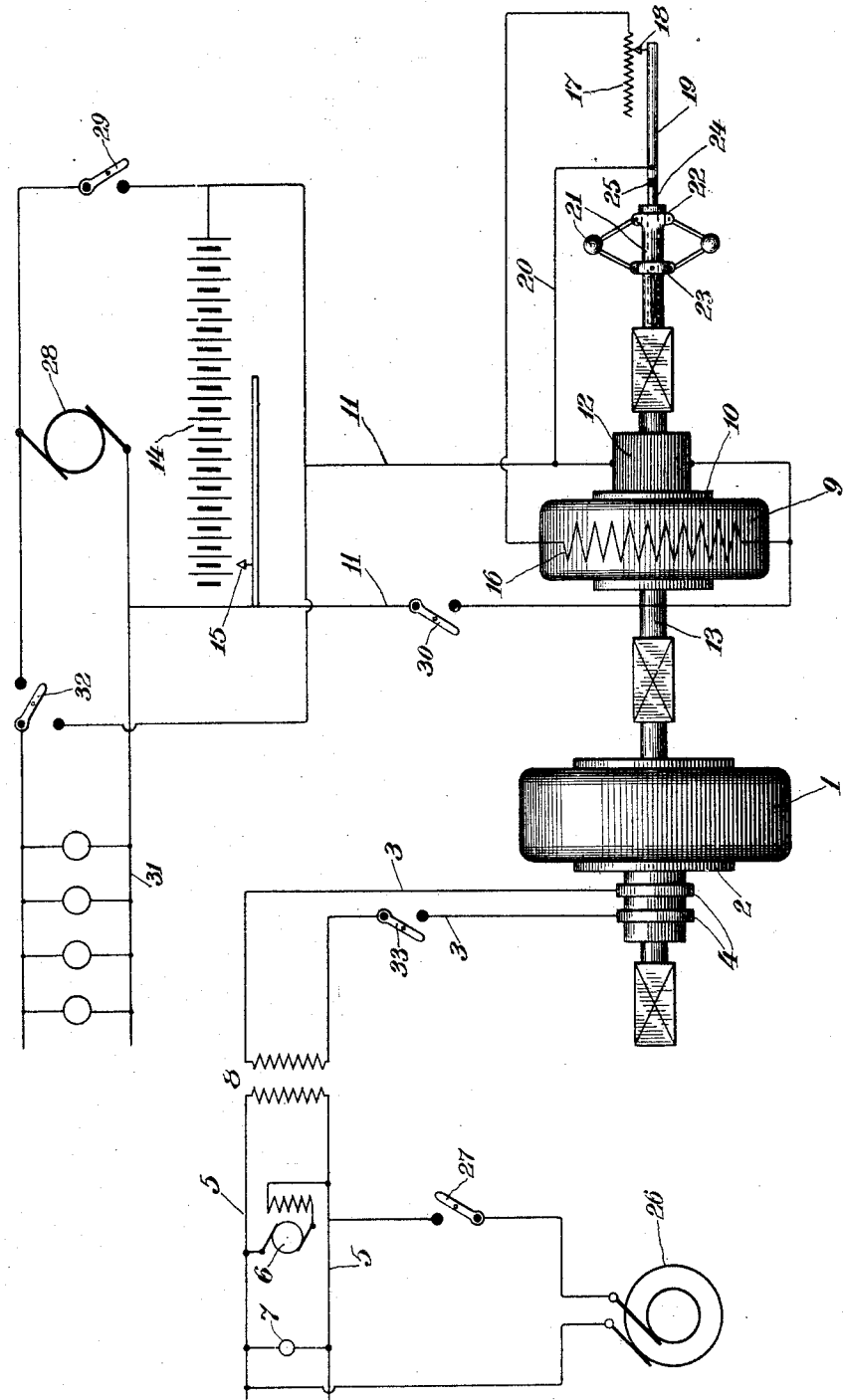

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

980,265.　　　Specification of Letters Patent.　　Patented Jan. 3, 1911.

Application filed December 17, 1908. Serial No. 467,944.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution and more especially to systems in which both alternating and direct currents are employed.

I have especially devised my improvements with relation to a system in which both alternating and direct current supply circuits are utilized and in which these circuits are operatively connected by suitable converting means. In such systems it is customary to employ a storage battery connected to the direct current circuit to aid in maintaining increases of load when they fall upon the system. Such being the case the direct current end of the converting apparatus is generally subject to considerable variations in voltage and in the usual form of converting apparatus employed such variations in voltage produce resulting variations in speed of the converting apparatus, when energy is being fed from the direct current side of the system to the alternating current side. This variation of speed produces changes of frequency of the alternating current output of the converting apparatus. On the other hand, when the energy is being transferred from the alternating current side to the direct current side of the system, the speed of the machine is fixed by the speed of the alternating current source.

One object of my invention is to provide an exceptionally simple and effective means for preventing such variations in speed and keeping the frequency substantially constant.

Further objects, features and advantages will be more clearly apparent from the detailed description given below taken in connection with the accompanying drawing which shows diagrammatically portions of a system embodying one form of my improvements.

Referring to the drawing 1 represents an alternating current dynamo electric machine which may be operated either as an electric generator or as a motor and the armature 2 of which is connected with an alternating circuit 3, 3, by means of slip rings 4.

At 5 is shown an alternating current distribution circuit supplying translating devices 6, 7. The circuit 5 is operatively connected with the circuit 3 either to receive or to give energy thereto by means of a transformer 8.

9 represents a direct current electric machine which may also be operated either as an electric generator or as a motor and which has its armature 10 operatively connected with a direct current circuit 11 by means of a commutator 12. The armatures 2 and 10 are mechanically connected to rotate at the same speed by a shaft 13. Connected across the direct current circuit is a battery 14 and one terminal 15 of the circuit 11 is adjustable to be connected to various points within the battery in accordance with the requirements of various conditions to which the system is subjected.

As thus far described when the load on the circuit 5, 5 is light the converting apparatus receives energy from the alternating current circuits 3, 5, which is transmitted mechanically to the direct current end of the converting apparatus comprising the machines 1 and 9, whereupon the energy is converted again into electrical form and a direct current is supplied to the circuit 11, 11, to charge the storage battery 14.

The apparatus as shown is designed to operate with a system having an ordinary drooping characteristic.

16 is a shunt field winding for the direct current end of the converting apparatus 9. This shunt winding 16 is connected in series with a variable resistance 17 varied by means of a movable contact 18 on an arm 19. The arm 19 is also used as a conductor to connect the contact 18 with a circuit 20 which completes the connection of the field winding 16. Carried upon the shaft of the converting apparatus or the converter is a centrifugal governor 21 of any well known form. The end 22 thereof is fixedly secured to the shaft while the end 23 is movable in accordance with variations in speed of the shaft. The end 23 is operatively connected with a shaft 24 which is fixedly secured to the shaft 19 to move the same longitudinally in accordance with said variations in speed of the converter. The shafts 24 and 19, however, are insulated from each other by insulating material 25.

A main source of supply may be provided on either or both sides of the converting apparatus. I have accordingly shown an alternating current generator 26 connected to feed the alternating current circuit 5 when the switch 27 is closed, and on the direct current side of the system I show a direct current generator 28 connected in parallel with the battery by means of a switch 29. Switches 30 and 33 are also provided in the circuits 11 and 3, so that the direct current side of the system and the alternating current side of the system may operate independently if it is so desired. A direct current work circuit 31 may be connected directly to the generator 28 or directly to the battery 14 by means of a switch 32.

When the battery or direct current circuit is supplying energy to the alternating current circuit through the converting apparatus at a predetermined normal voltage the machine 9 will run at the proper speed to maintain the frequency of the alternating current end of the converter at its proper value. Should the voltage of the battery or direct current circuit be greater than its normal value the speed of the motor generator set or machines 1, 9, will increase, thereby causing the governor 21 to vary the resistance 17 in series with the field 16 to cut out resistance in series with the field 16 and thereby increase the field strength of the direct current end of the converting apparatus. The speed of the motor generator, under these circumstances, is quickly limited by this increase of the field strength, so that the variations of speed are unsubstantial. Upon a drop of the direct current circuit the decrease of speed of the motor generator is similarly kept within small limits by the decreasing of the field strength of the motor end of the device.

From the above it will be apparent that I have provided economically simple and effective means for regulating the frequency of such devices and for carrying out the various objects of my invention and bringing about the various advantages sought.

Although I have described my improvements with great detail I do not desire to be limited thereto but Having fully and clearly described my invention what I claim as new and desire to secure by Letters Patent, is:

1. The combination of an alternating current source, a direct current source, an alternating current work circuit fed by the alternating current source, a motor generator operatively related between said sources, and means for varying the field strength of the direct current end of the motor generator with variations of speed thereof.

2. The combination of an alternating current source, a direct current source, an alternating current work circuit fed from the alternating current source, a motor generator connecting said sources, and means for varying the field strength of the direct current end of the motor generator, to maintain the speed of the motor generator substantially constant while driven from the direct current side of the system.

3. In an electrical system of distribution, the combination of alternating and direct current power circuits, a direct current source for feeding the direct current circuit, an alternating current source for feeding the alternating current circuit, a motor generator for transferring energy from one of said circuits to the other, an alternating current work circuit connected to the alternating current circuit and means responsive to speed variations of the motor generator for varying the field strength of the direct current end of the motor generator to maintain the speed of the motor generator substantially constant when driven from the direct current side of the system.

In testimony whereof, I have signed my name to this specification, in the presence of two subscribing witnesses.

ALBERT S. HUBBARD.

Witnesses:
 EDWIN SEGER,
 GORHAM CROSBY.